June 5, 1956     I. HEIM     2,748,417
MACHINE FOR ASSEMBLING LANTERN SLIDES AND THE LIKE
Filed Jan. 12, 1953     2 Sheets-Sheet 2
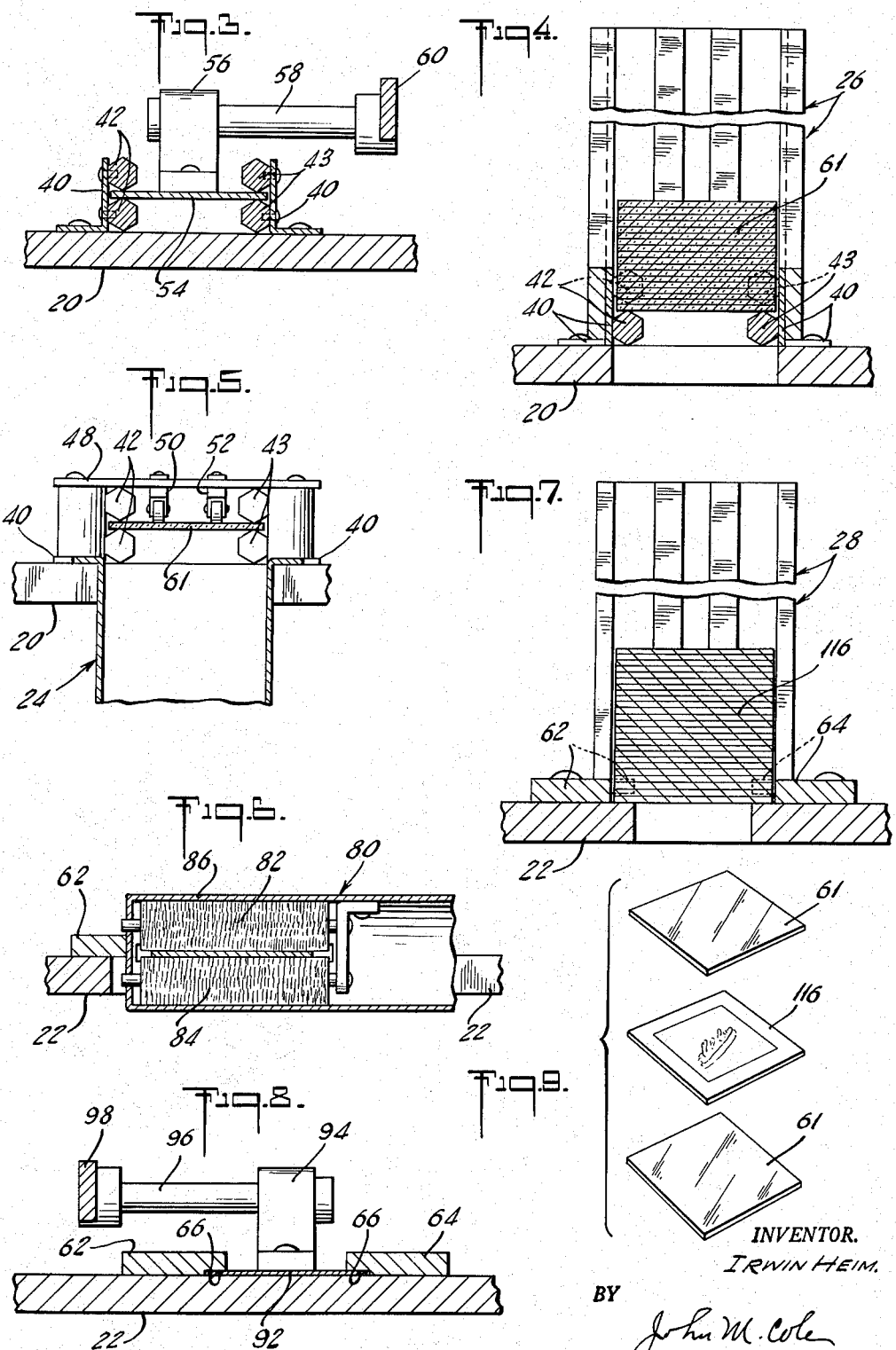
INVENTOR.
IRWIN HEIM.
BY
John M. Cole
ATTORNEY.

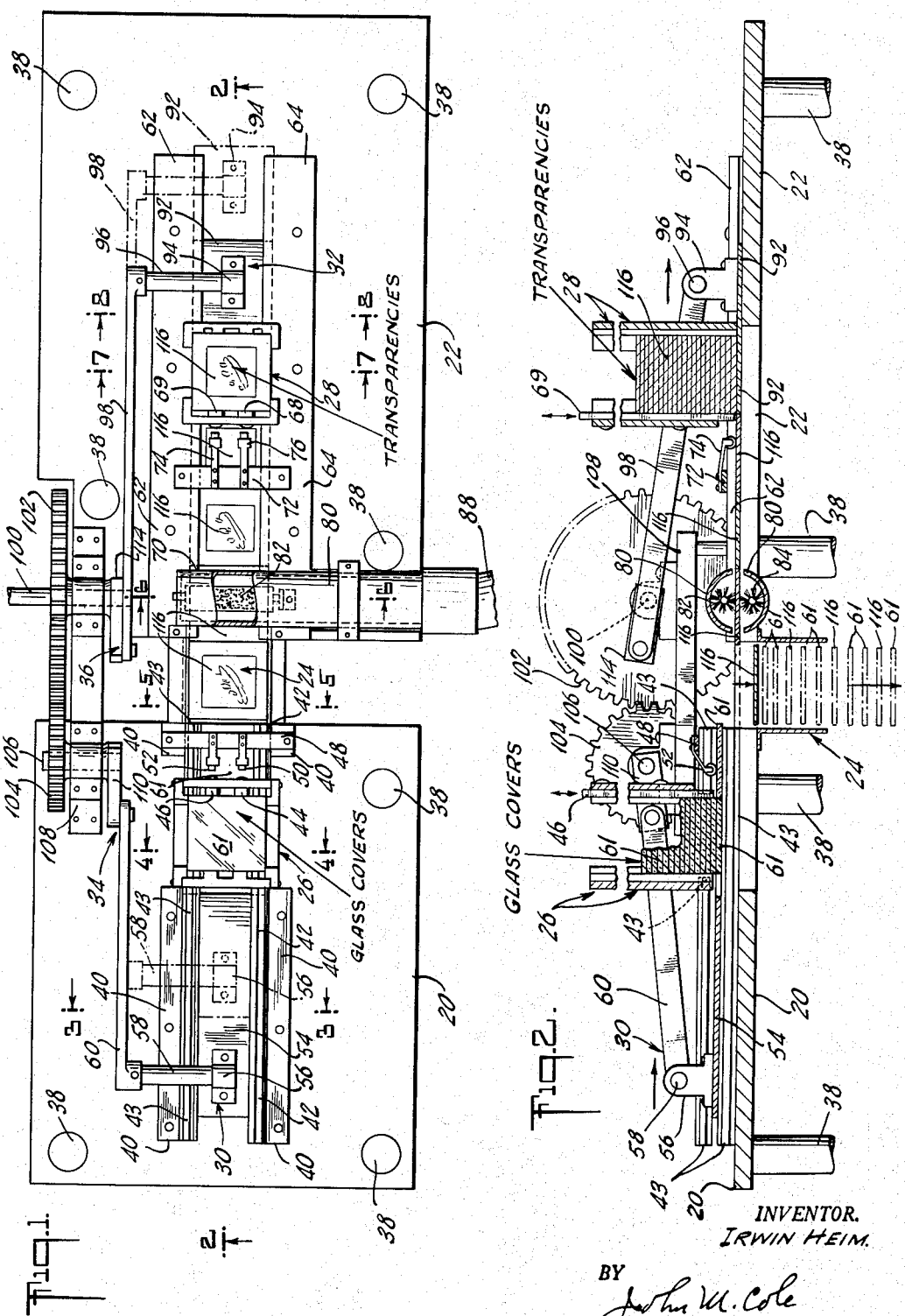

United States Patent Office 2,748,417
Patented June 5, 1956

2,748,417

MACHINE FOR ASSEMBLING LANTERN SLIDES AND THE LIKE

Irwin Heim, Valley Stream, N. Y.

Application January 12, 1953, Serial No. 330,646

8 Claims. (Cl. 15—308)

The present invention relates to machines for assembling lantern slides and the like and more particularly to a machine for preassembling small picture transparency slides between protective glass covers which are later to be taped together to provide compact units that may be readily handled and cleaned without damage to the film transparency itself.

It is well known that the conventional picture transparency mounted in cardboard slides is easily damaged by scratching, and that the collection of dust and dirt thereon impair the quality of the picture projected from the transparency. It is accordingly an object of the present invention to provide a machine for assembling protective covers about a picture transparency slide to protect the slide and improve the quality of the picture projected therefrom. It is another object of the present invention to provide a machine for assembling picture transparency slides between protective glass covers in sandwich fashion and depositing the assembly in a receiving hopper from which they may be conveniently removed and taped together. It is another object of the present invention to provide a machine of a simple construction adapted for mass production assembly of picture transparencies and protective covers therefor that may be easily and simply constructed and operated. These and other and further objects will be in part apparent and in part pointed out as the specification proceeds.

In the accompanying drawings is shown for purposes of illustration of the present invention, an embodiment in which the invention may take form, it being understood that the drawings are illustrative of the invention rather than limiting of the same.

In the drawings:

Fig. 1 is a top plan view of a machine according to the present invention, showing the hoppers and operating mechanism for assembling the picture transparencies and protective covers therefor;

Fig. 2 is a longitudinal sectional view taken on the line 2—2 of Fig. 1;

Fig. 3 and Fig. 4 are sectional views taken on the lines 3—3 and 4—4 respectively of Fig. 1, and showing the glass cover shifting mechanism;

Fig. 5 is a sectional view taken on the line 5—5 of Fig. 1 and showing the chute or discharge hopper;

Fig. 6 is a sectional view taken on the line 6—6 of Fig. 1, showing the transparency cleaner;

Figs. 7 and 8 are sectional views taken on the lines 7—7 and 8—8 respectively of Fig. 1 and showing the transparency shifting mechanism; and Fig. 9 is an exploded perspective view of the components assembled by the machine to form a sandwich.

Referring now to Fig. 1 the machine comprises generally a pair of plates or tables 20 and 22, a central delivery chute or hopper 24 disposed between said tables, guiding means on each of said tables or plates, one for the glass plates, the other for the transparencies, forming paths along which the plates and transparencies are adapted to be moved, a glass plate supply hopper or stacking chamber 26 mounted above the guiding means on table 20, a transparency supply hopper or stacking chamber 28 mounted above the guiding means on table 22, reciprocatory shifters or rams 30 and 32 for shifting or ejecting one at a time glass plates and transparencies from the respective supply hoppers, and operating means 34 and 36 for said shifters 30 and 32.

The plates or tables 20 and 22 are mounted on legs 38 or other suitable supporting means for positioning the mechanisms at the same convenient operating height with said receiving chute extending downwardly therebetween.

The guiding means on table 20 comprises a pair of angles 40 mounted approximately one glass plate apart and extending laterally away from the side of the central hopper 24. Each angle 40 carries thereon two hexagonal rods 42 and 43 which are vertically spaced the width of a glass cover or plate to form a relatively sharp edged guiding track therefor. The hopper or stacking chamber 26 is mounted above these rods on the angles 40 and spaced from the receiving hopper 24 the length of the glass plate, as clearly shown in Fig. 2. The upper rod of each pair 42 and 43 is cut away beneath the hopper 26 so that a stack of glass covers positioned therein will rest on the upwardly disposed edges of the bottom bars. The side of the hopper 26 facing receiving chute 24 carries a pair of vertically adjustable strips 44 and 46 which are adapted to project downwardly to form an accurately controlled discharge opening therefrom so that only the bottom glass plate can be discharged from the hopper on each stroke of operation of the device.

Mounted between the hopper 26 and chute 24 on a bracket 48 on angles 40 are two spring biased rollers 50 and 52 which are adjusted to control the discharge of the covers into the receiving chute 24 and prevent catapulting or breakage against the opposite side.

Mounted in the track between the hexagonal bars on the other side of the hopper 26 is the reciprocatory shifter or ram structure 30 which comprises a plate 54 carrying a bracket 56 which has fixed therein shaft 58 which in turn is pivotally joined to the connecting rod 60 of the operating mechanism 34, as will be described in detail herein. The plate 54 is of such a size and so positioned that on its forward stroke it ejects one glass cover 61 from the hopper 26 toward the receiving chute 24. In the position shown in Figures 1 and 2 the ram is at its rearward limit of travel after having ejected a cover.

The guiding means on table 22 which is positioned on the opposite side of hopper 24 from that just described comprises two gibs 62 and 64 mounted thereon and having their facing edges undercut at 66 (see Figure 8) to form with said plate 22 guiding tracks along which the transparencies are adapted to be moved.

Stacking chamber 28 is mounted above these gibs 62 and 64 in a similar manner to the mounting of chamber 26 above the bars 42 and 43 and has similar adjustable side strips 68 and 69 to permit only the bottom transparency, to be ejected therefrom. The gibs 62 and 64 are cut away beneath the hopper 28 so that a stack of transparencies positioned therein will rest on plate or table 22. The hopper or stacking chamber 28 is spaced several transparency widths from chute 24 and plate 22 is cut away in the path of travel of the transparencies as indicated at 70 to permit the installation of the transparency cleaning and retarding assemblies.

Mounted on a bracket 72 on gibs 62 and 64 between hopper 28 and chute 24 are two spring biased rollers 74 and 76 which are tensioned to control the discharge of the transparencies into the chute 22 similarly to the control of the glass covers.

Also positioned between the hopper 28 and chute 24 on gibs 62 and 64 is the transparency cleaning assembly 80 shown in detail in Figure 6. This assembly comprises two freely rotatable spiral brushes 82 and 84 one mounted above and the other below the path of travel of the transparencies, a hood structure 86 substantially surrounding said brushes and a hose 88 attached thereto and connected to an exhaust fan (not shown) to withdraw air from within said hood and pick up any dust, particles of paper and so on loosened by the brushes 82 and 84. Thus the transparencies are thoroughly cleaned just prior to the discharge into the receiving chute between the glass covers.

Mounted within the tracks formed by gibs 62 and 64 and plate 22 on the opposite side of stacking chamber 28 from that of the cleaning assembly 80 is the reciprocatory shifter or ram structure 32. This is similar to the ram structure 30 and comprises plate 92, bracket 94 mounted thereon, shaft 96 mounted in bracket 94 and pivotally carrying thereon connecting rod 98 which is part of the operating mechanism 36.

The protective glass covers are advantageously washed and cleaned prior to their insertion in the supply hopper 26 which is preferably done with care to prevent the soiling of the surfaces of the glass plates such that would impair the quality of the picture transmitted from the inclosed transparency. This cleaning and washing operation may take place separately in an independent machine and the slides may be transferred by the operator or the cleaning and washing machine may automatically feed into the hopper 26 as desired.

The glass covers together with the transparencies which are discharged into chute 24 are preferably caught in an open end box or stacking member (not shown) by the operator and manually transferred to other machines for subsequent operations such as taping. During this operation the operator may visually inspect the transparencies and covers to maintain the desired quality.

The drive mechanism for the ram structures 30 and 32 as here shown includes a shaft 100 driven at suitable speed by a motor not shown. Shaft 100 has mounted thereon a gear 102 which is positioned to engage a gear 104 on shaft 106. Shafts 104 and 106 are mounted on a bridge 108 which ties the two tables 20 and 22 together. The gears 102 and 104 are chosen such that gear 104 and its respective shaft 106 will rotate two times for each revolution of the gear 102. Shaft 106 drives a crank 110 which is pivotally joined to the connecting rod 60 to drive the slider 30. Similarly the shaft 100 drives the crank 114 which is pivotally connected at its outer end to the connecting rod 98 to drive the slider 92.

Referring now to Figure 9, the assembled product of the machine comprises the mounted picture transparency or slide 116 such as used in identification training work and a pair of protective glass covers 61 disposed on either side thereof in sandwich fashion. The transparency 116 may be completely protected and, after taping into a sealed unit the unit may be readily cleaned.

Since it is obvious that the invention may be embodied in various forms and constructions within the scope of the claims, I wish it to be understood that the particular form shown is but one of the forms, and various modifications and changes being possible, and I do not otherwise commit myself in any way with respect thereto.

I claim:

1. A machine for preassembling an intermediate component and two protective components to form a stack of sandwiches, said machine having two horizontally spaced stacking chambers, one for the protective components and one for the intermediate components, a sandwich receiving chute between the stacking chambers and at a lower level, horizontal guides leading from the stacking chambers to the chute, there being a discharge opening from each chamber on the side toward the chute and of a height to permit the passage of one component only from each stack, a reciprocatory shifter movable back and forth under each chamber and acting on the forward stroke to shift one component only from the chamber toward the chute, and common driving means for the shifters which times the shifter to deposit an intermediate component between each alternate pair of protective components.

2. A machine such as claimed in claim 1 wherein the storage chambers are spaced from the receiving chute to accommodate an ejected component before it passes beyond the guides and having retarding means bearing on the respective ejected components in the guides to arrest the movement thereof during the return movement of the shifter.

3. A machine such as claimed in claim 1, having a suction chamber enclosing therein brush means past which intermediate components are moved by the corresponding shifter.

4. A machine such as claimed in claim 1, wherein the guides for the protective components include relatively sharp edged members between which the said components slide.

5. A machine for preassembling lantern slides having a transparency between two glass plates, said machine comprising two tables at the same height, a discharge chute intermediate the tables and extending downwardly, a glass plate storage magazine on one table and spaced from the chute to accommodate at least one plate between the magazine and chute, a transparency storage magazine on the other table and spaced from the chute to accommodate at least two transparencies between the latter magazine and the chute, horizontal guides leading from the respective magazines to the chute and in which the plates and transparencies are exposed, a reciprocating shifter for shifting glass plates one at a time from the plate storage magazine past the guides and to the chute, a second shifter for shifting transparencies one at a time from the transparency storage magazine past the guides and into the chute, retarders for the exposed plates and transparencies to arrest movement after ejection by the shifter, and common operating means for the shifters to shift two plates after each shift of a transparency.

6. A machine for assembling in sandwich fashion picture transparencies and glass protective covers therefor, comprising in combination a central receiving hopper for said transparencies and covers, a transparency supply hopper disposed to one side of said receiving hopper, a cover supply hopper disposed to the other side of said receiving hopper, a reciprocating ram structure mounted below each of said slide and cover supply hoppers to eject therefrom one at a time transparencies and covers respectively, guiding members extending between the bottoms of said supply hoppers and said receiving hopper to carry said ejected transparencies and covers to said receiving hopper, driving mechanism for said ram structures including differential linking structure to reciprocate said cover ram structure twice for each reciprocation of said slide ram structure, and a transparency cleaning assembly positioned about said guiding members between said transparency supply hopper and said receiving hopper comprising brush means mounted to sweep the surfaces of said slides, and a suction nozzle positioned about said brush means and adapted to be connected to a source of suction for drawing air through said nozzle whereby dust, lint and the like loosened by said brush means is removed from said transparencies.

7. The combination of claim 6 wherein said guiding members for the glass covers include retarding members which retard the speed of the covers as they approach the hopper.

8. A machine for assembling picture transparenices and protective glass covers therefor in sandwich fashion comprising a frame member, side guide members, a pair of vertically spaced bars mounted on each side guide member, a hopper adapted to contain a supply of glass covers and mounted above said guides, the upper bar of said pairs being cut away beneath said cover hopper, a first ram slidably mounted between said spaced bars so as to eject the bottom cover from said cover hopper, a receiving chute mounted at the other end of said bars and guide members, a pair of spring urged rollers supported on said guide members adjacent said receiving chute to control the discharge of the glass covers therein, a second pair of guiding bars mounted on said frame so as to lead to another side of said receiving chute, a transparency hopper mounted above the second bars, a second ram slidably positioned between second guiding bars adjacent the side of the second hopper remote from said receiving chute so as to eject transparencies one at a time therefrom, a cleaning brush positioned between the second hopper and the receiving chute, a suction line mounted about said brush to remove matter loosened from said transparencies, a pair of spring biased rollers bearing on the transparencies and between the second hopper and the brush to retard the discharge of transparencies into said receiving hopper, and driving means for reciprocating said first ram at a rate twice that of said second ram, comprising two meshed gears, one gear being half the diameter of said first gear and connecting rods drawn by the gears and connected to the rams.

References Cited in the file of this patent

UNITED STATES PATENTS

| | | |
|---|---|---|
| 703,722 | Franke | July 1, 1902 |
| 1,089,453 | Wood | Mar. 10, 1914 |
| 1,536,186 | Arnold | May 5, 1925 |
| 1,564,843 | Fulton | Dec. 8, 1925 |
| 1,966,878 | Bluzat | July 17, 1934 |
| 2,252,478 | Beekman et al. | Aug. 12, 1941 |
| 2,363,631 | Walters | Nov. 28, 1944 |
| 2,509,467 | Anderson | May 30, 1950 |